(12) United States Patent
Perucchi

(10) Patent No.: US 6,560,791 B2
(45) Date of Patent: May 13, 2003

(54) KITCHEN SINK WITH AN ADDITIONAL BASIN

(75) Inventor: Bruno Perucchi, Winterthur (CH)

(73) Assignee: Niro-Plan AG, Zug (CH)

( * ) Notice: Subject to any disclaimer, the term of this patent is extended or adjusted under 35 U.S.C. 154(b) by 0 days.

(21) Appl. No.: 10/035,939

(22) Filed: Dec. 24, 2001

(65) Prior Publication Data

US 2002/0078497 A1 Jun. 27, 2002

(30) Foreign Application Priority Data

Dec. 27, 2000 (DE) ......................... 100 65 057

(51) Int. Cl.[7] ................................. E03C 1/01
(52) U.S. Cl. ................................. 4/642; 4/654
(58) Field of Search .............. 4/639–642, 654, 4/656, 657; D23/284, 287, 290, 308

(56) References Cited

U.S. PATENT DOCUMENTS

| 1,102,411 A | * | 7/1914 | James ........................... 4/641 |
| 1,356,362 A | | 10/1920 | Hensal |
| 1,711,731 A | | 5/1929 | Hein |
| 2,308,123 A | * | 1/1943 | Stein ............................ 4/642 |
| D203,802 S | * | 2/1966 | Graning, Jr. |
| D230,402 S | * | 2/1974 | Graning, Jr. |
| 4,305,166 A | * | 12/1981 | Rose |
| 4,336,620 A | * | 6/1982 | Gresh ........................... 4/641 |
| D397,213 S | * | 8/1998 | Bonnell |
| D420,727 S | * | 2/2000 | Hundley |
| D421,105 S | * | 2/2000 | Bonnell et al. |
| D426,624 S | * | 6/2000 | Kohler, Jr. et al. |

FOREIGN PATENT DOCUMENTS

| CH | 192 107 | * | 7/1937 | ................. 4/640 |
| DE | 34 21 821 A1 | | 12/1985 | |
| DE | 3421821 C2 | | 8/1989 | |
| DE | 4027428 A1 | | 3/1992 | |
| DE | 93 14 916.1 U1 | | 1/1994 | |
| DE | 19907212 A1 | | 8/2000 | |

* cited by examiner

*Primary Examiner*—Charles R. Eloshway
(74) *Attorney, Agent, or Firm*—Akin, Bump, Strauss, Hauer & Feld, L.L.P.

(57) ABSTRACT

A kitchen sink has at least one main basin and an additional basin, wherein both basins have their own drains. The additional basin is formed as a protrusion in a side wall of the main basin and projects into the main basin. The additional basin may be provided with accessories, such as a basin insert or sieve, and the sink may be provided with preparation board(s), which are adapted to the additional basin and/or the basin insert.

17 Claims, 5 Drawing Sheets

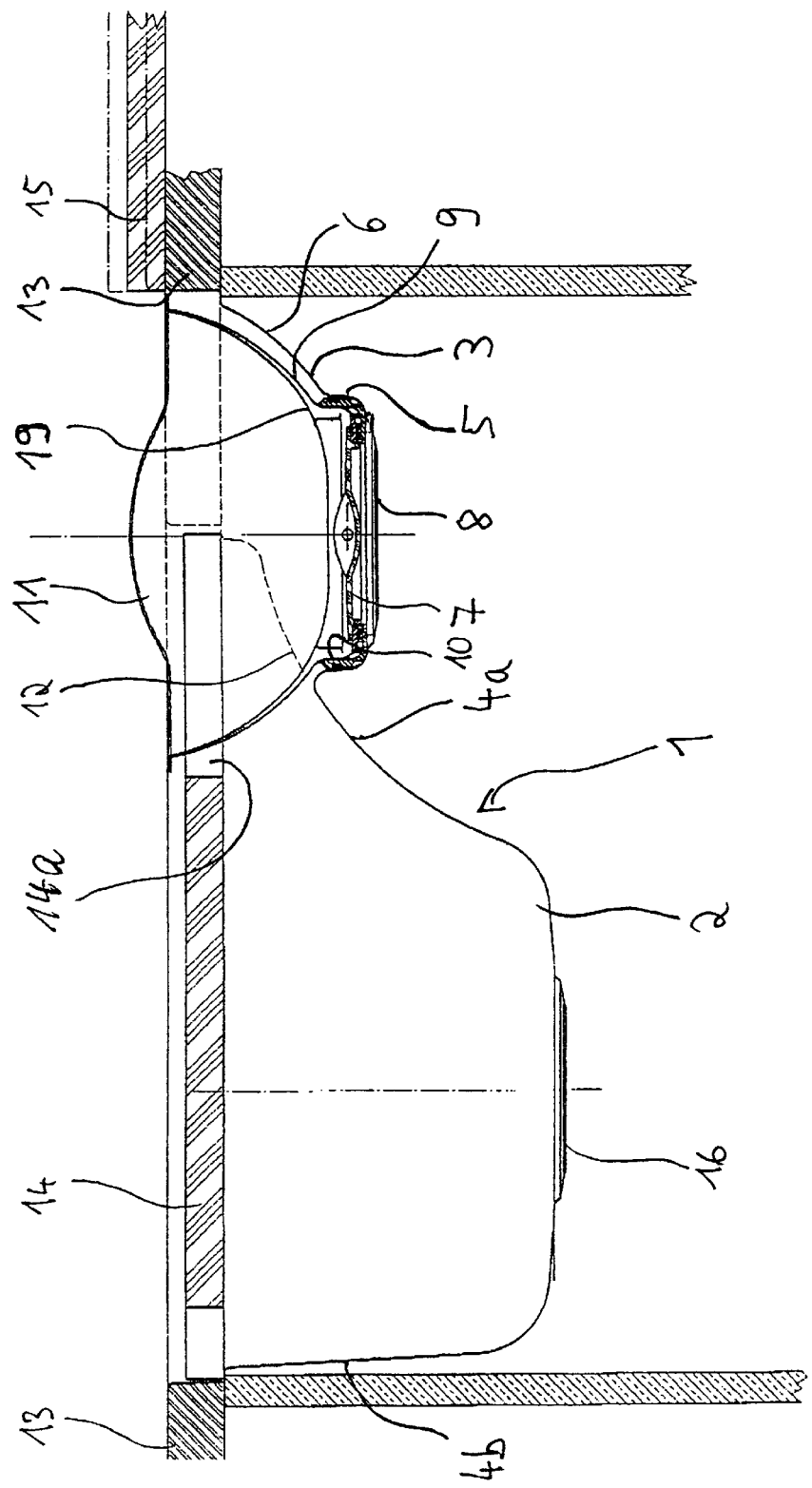

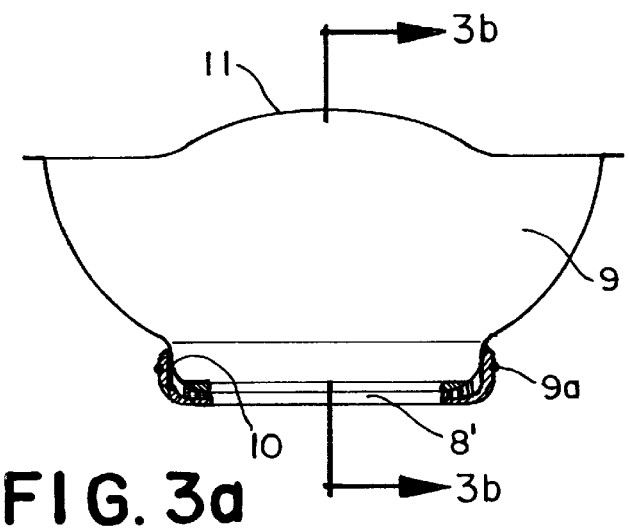
FIG. 3a
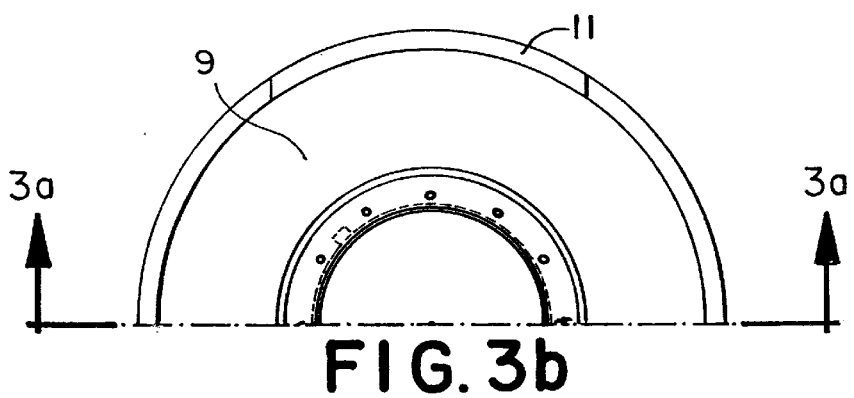
FIG. 3b
FIG. 4a
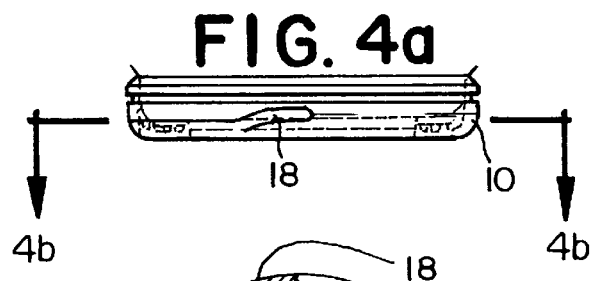
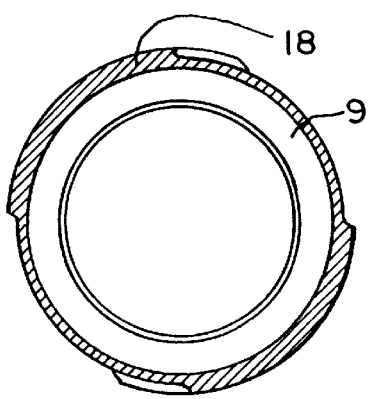
FIG. 4b

KITCHEN SINK WITH AN ADDITIONAL BASIN

BACKGROUND OF THE INVENTION

The invention relates to a kitchen sink with at least one main basin and an additional basin and, optionally, wherein the additional basis has its own drain.

Additional basins in kitchen sinks are known in the prior art, in particular as residual basins which, separated from the main basin by a partition, are usually arranged between the drip surface of the drip part and the main basin. The upper edges of this residual basin lie here approximately at the level of the drip surface of the drip part, so that water running off of the drip part flows into the additional basin, in case the drip part does not have its own drain. Frequently, the drain of the additional basis also functions as an overflow, when the drain of the main basin is stopped up.

Kitchen sinks of this type with main and additional basins separately arranged from one another have been manufactured and marketed for years by the assignee of the present invention, among others.

BRIEF SUMMARY OF THE INVENTION

Proceeding from the known prior art, an object of the present invention lies in improving a kitchen sink with main and additional basin, such that its functional capacity is increased and additional possible applications are made available. This object is accomplished in accordance with the invention in that the additional basin, on the one hand, is formed by a protrusion or outgrowth of the side wall of the main basin and, on the other hand, projects into the main basin.

The invention is also based on the concept of no longer spatially separating the main and additional basin, but rather of locally extending the contour of the main basin with the additional basin. This extension makes possible dipping unwieldy objects, such as grills, pans with long handles, or the like, into the main basin, since the additional basin can be used as additional space into which, for example, the pan handle extends.

The transition between main basin and additional basin can, in addition, serve as a support edge for unwieldy objects, and consequently facilitates handling them, since it lies at a distinctly deeper level than the upper edge of the main basin.

The function of the additional basin is not impaired thereby. It can still serve in a typical manner as a residual bowl or receptacle for depositing vegetables or the like to be cleaned. Finally, there results from the configuration of the kitchen sink of the invention overall a new and separate design.

In one embodiment of the present invention the side wall where the protrusion is arranged can have a smaller incline than the remaining side walls of the main basin. This leads not only to an enlargement of the volume of the main basin but also to an agreeable appearance of the entire sink unit. In particular, by this measure, the bowl-shaped construction of the additional basin is favored.

Expediently, the protrusion is restricted to the upper half of the side wall. This makes it possible to fill a sufficiently large volume of the main basin, namely the entire lower half, with water for washing dishes or the like, while at the same time ensuring that the additional basin is not reached by this water. This is especially advantageous when the additional basin serves as a receptacle for food yet to be processed, such as fruit or lettuce, which should not come into contact with the wash water of the main basin.

It can further be provided that the side wall with the protrusion forms the transition to a drip part, so that the drip part connects to the side of the additional basin facing away from the main basin. If the protrusion is arranged in the above manner in a side wall with a lesser slope compared to the other side walls, the drip part and the additional basin fit harmoniously with the overall impression of the sink unit. In principle, it is instead conceivable to provide the protrusion on any other desired wall of the main basin, optionally on several walls.

In a preferred embodiment of the invention, at least about half of the additional basin lies outside the basic contour of the main basin. That is, the imaginary contour of the main basin cuts off at most 50% of the additional basin. A larger space outside the main basin is thereby created, so that particularly unwieldy objects can be cleaned in the sink unit.

It is particularly expedient if the additional basin has a holding device for a basin insert insertable into the additional basin. With a basin insert of this type a substantially enlarged space compared to the additional basin volume can be created, in which food or the like can be stored, cleaned or otherwise processed. For this, the basin insert provided for the additional basin can be drawn far upward and project far into the main basin.

With respect to the holding device, this can be constructed as a releasable clamp, bayonet or like closure or lock. The releasability of the holding device makes it possible to fill the basin insert conveniently with foods or the like outside the sink unit and then place the entire insert into the additional basin, for example for rinsing.

The basin insert itself can be adapted expediently to the contour of the additional basin, but be constructed substantially axially symmetrical. Here, bowl shapes of the most different variations come into consideration, even deviating from axial symmetry.

Furthermore, handles can also be installed or molded on the basin insert, which facilitates handling it, especially for removing the basin insert from the additional basin.

In this connection it is expedient if the basin insert has its own drain. This independent drain can also be constructed as a sieve or the like. Especially when cleaning food in the basin insert, it is then ensured that water and contaminants can flow off into the drain of the additional basin.

In the event that the sink unit is built in below the counter, the upper edge of the basin insert can project above the sink unit, such that the basin insert is approximately aligned with the upper surface of the counter. This has the advantage that foods can be cut on the counter and then can simply be pushed in the cut state from the counter surface directly into the basin insert.

Finally, the sink unit can additionally have a preparation board, supportable on the main basin, which on one side is cut out corresponding to the contour of the additional basin. The preparation board and additional basin insert are then aligned with each other, such that they can be used together and fit flush together. If the levels of the preparation board and the basin insert are then aligned with each other, wastes from cutting or cleaning on the preparation board can be pushed easily and directly into the basin insert.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a longitudinal section through a kitchen sink according to the invention installed in a counter;

FIG. 2b is a longitudinal sectional view of the sink unit taken along line 2b—2b of FIG. 2a;

FIG. 3a is a sectional view of a basin insert for an additional basin of the sink unit, taken along line 3a—3a of FIG. 3b;

FIG. 3b is a sectional view taken along line 3b—3b of FIG. 3a;

FIG. 4a is a side sectional view of a bayonet lock formed in the lower part of the basin insert of FIG. 3;

FIG. 4b is a radial sectional view of the bayonet lock taken along line 4b—4b of FIG. 4a;

DETAILED DESCRIPTION OF THE INVENTION

Figure 2A:
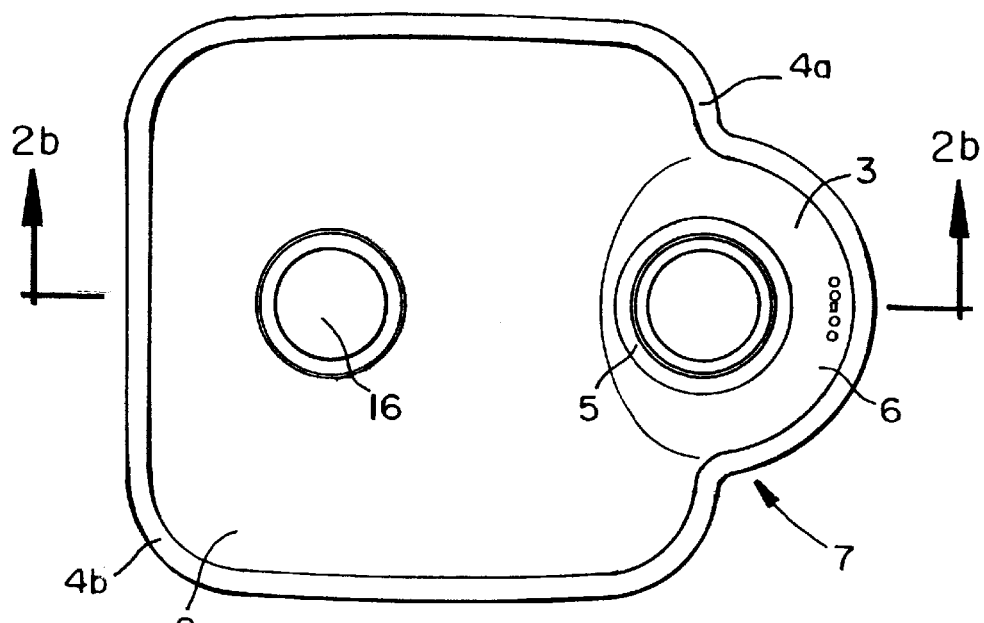
FIG. 2a is a plan view of the sink unit ot FIG. 1.

FIG. 1 represents a kitchen sink 1 of the invention in longitudinal section. This kitchen sink has a main basin 2 and an additional basin 3 which transition in a common outer splash rim. This splash rim is positioned below the counter 13 in the embodiment shown. It is a basic feature of the invention that the additional basin 3 be formed by a protrusion of a side wall 4a of the main basin 2. The main basin 2 is formed by additional side walls, of which only the side wall 4b lying opposite side wall 4a is represented in FIG. 1. It can be clearly recognized that the slope of side wall 4a is less than the slope of the relatively steeply running side wall 4b.

With respect to additional basin 3, this comprises a circular bottom, which is basically constructed as drain 8, a cylindrical shoulder 5 and a side wall 6 adjoining the shoulder 5 and extending upwardly like a tub. In the lower region of the cylindrical shoulder 5, parts of a bayonet lock are situated on the inside.

In the cylindrical shoulder 5 of the additional basin 3 a basin insert 9, represented in FIG. 3, can be screwed in by means of the above-mentioned bayonet lock. For this purpose, the basin insert 9 has on its underside a cylindrical shoulder 10 which engages into the cylindrical shoulder 5 of the additional basin and is likewise constructed as a part of the bayonet lock.

The further shape of the basin insert 9 is essentially adapted to the contour of the additional basin 3, namely constructed bowl-like with its own drain opening 8', but such that the insert projects extensively into the main basin with one part of its periphery, as is recognizable by the imaginary contour 12 of the main basin, drawn in dotted lines. On the upper side of the basin insert 9, handles are recognizable which facilitate handling, especially screwing the basin insert 9 in and out of the additional basin 3, so that it can be stably fastened in the additional basin.

Further accessories are installable into the basin insert 9, possibly a sieve insert 19, which is apparent from FIG. 1 and FIG. 5. This sieve insert has nearly the same shape as the basin insert 9, so that it fits flush into the latter. The sieve insert 19 can instead, if necessary, be inserted without basin insert 9 directly into the additional basin 3.

It is further recognizable in FIG. 1 that the upper edge of the basin insert 9, as well as sieve insert 19, projects upwardly above the sink unit and aligns with the upper surface of the counter 13.

Finally, two preparation boards 14, 15 are represented in FIG. 1, wherein the first preparation board 14 lies on the upper edge of the main basin 2 and has on the side facing the basin insert 9 a cutout 14a corresponding to the contour of basin insert 9. On the opposite side the preparation board 14 has an additional cutout in which a user can comfortably reach in with his/her hand when he/she wishes to remove the preparation board. The other preparation board 15 lies on the counter 13.

FIG. 2a depicts the kitchen sink 1 with main basin 2 and additional basin 3 in plan view. It is clearly recognizable from this plan view that more than half of the additional basin 3 lies outside the basic shape of the main basin 2. That is to say, the imaginary contour of the main basin 2 cuts off less than half of the additional basin 3.

Furthermore, it is here clearly to be seen that the additional basin 3 is formed as a protrusion in the side wall 4a. Here, the upper edge of the additional basin 3 forms in plan view approximately a semicircle, while the opposite edge, which forms the transition to the main basin, has the form of a falling elliptical arch.

Figure 2B:
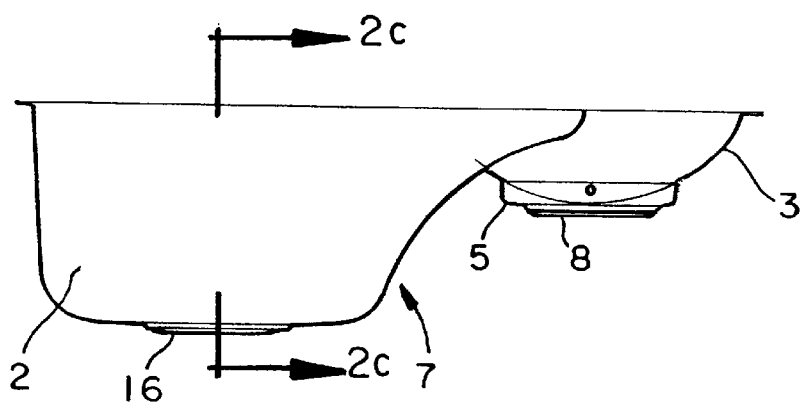
Figure 2C:
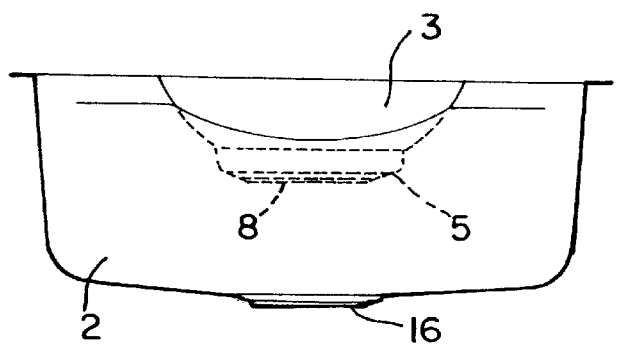
FIG. 2c is a sectional view of the sink unit taken along line 2c—2c of FIG. 2b.

FIG. 2b shows a longitudinal section of the sink unit along line 2b—2b of FIG. 2a, while FIG. 2c shows a cross section along line 2c—2c of FIG. 2b.

FIGS. 3a–b and 4a–b show a round, tub-shaped basin insert 9 for the additional basin 3 with the bayonet lock. To be recognized in FIGS. 3a–3b are two handle grips 11 formed on the upper edge, drain 8' arranged centrally in the bottom, and the bayonet lock 9a. For this purpose, as seen in FIGS. 4a–4b, outer peripheral ledges 18 are formed on the cylindrical shoulder 10 of the basin insert 9, which are constructed such that they can engage into corresponding recesses of the cylindrical shoulder 5 of the additional basin 3.

Figure 5A:
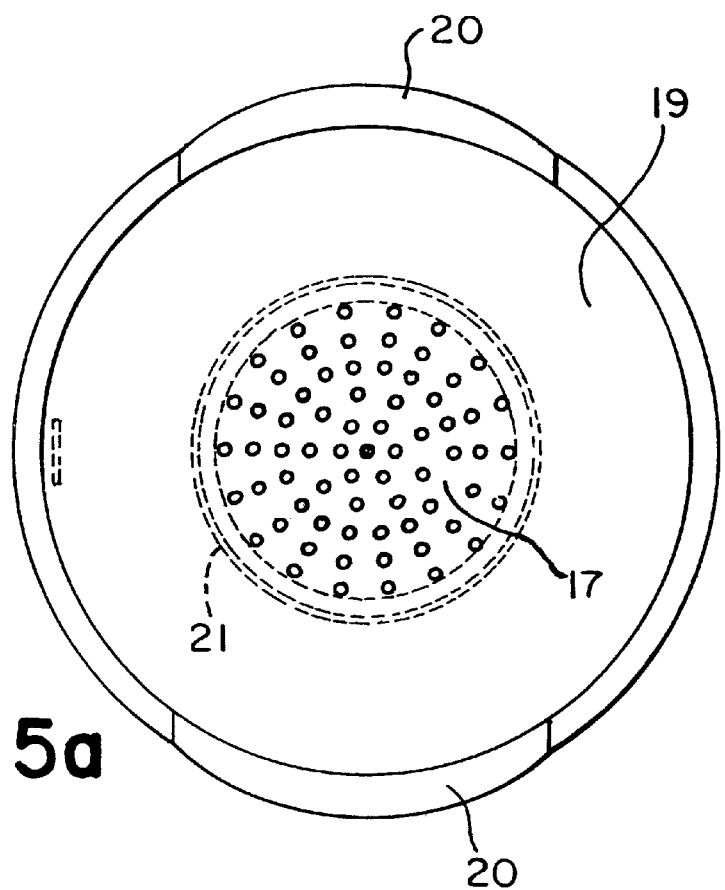
FIGS. 5a–5b are side and plan views, respectively, of a sieve insert.
Figure 5B:
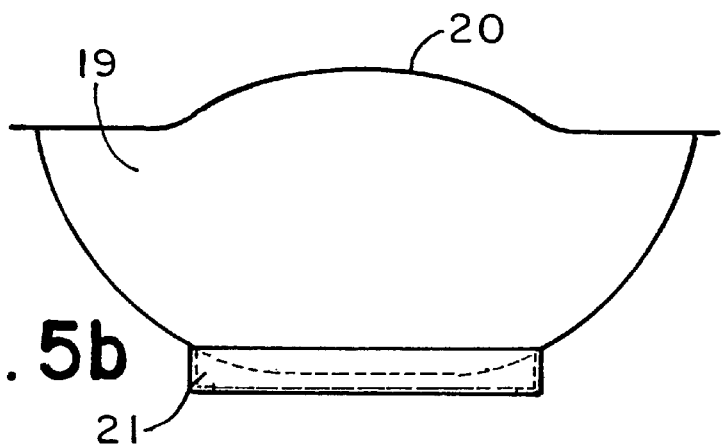

FIGS. 5a–5b show a sieve insert 19, which fits into the basin insert 9, but also fits directly into the additional basin 3. It thus likewise has a round tub shape with the upper handle grips 20 and a lower cylindrical shoulder 21, which functions as a positioning edge. Its bottom region 17 is configured like a sieve with a plurality of openings. This sieve insert is especially suited for rinsing off foods, quenching pasta, and the like.

Figure 6A:
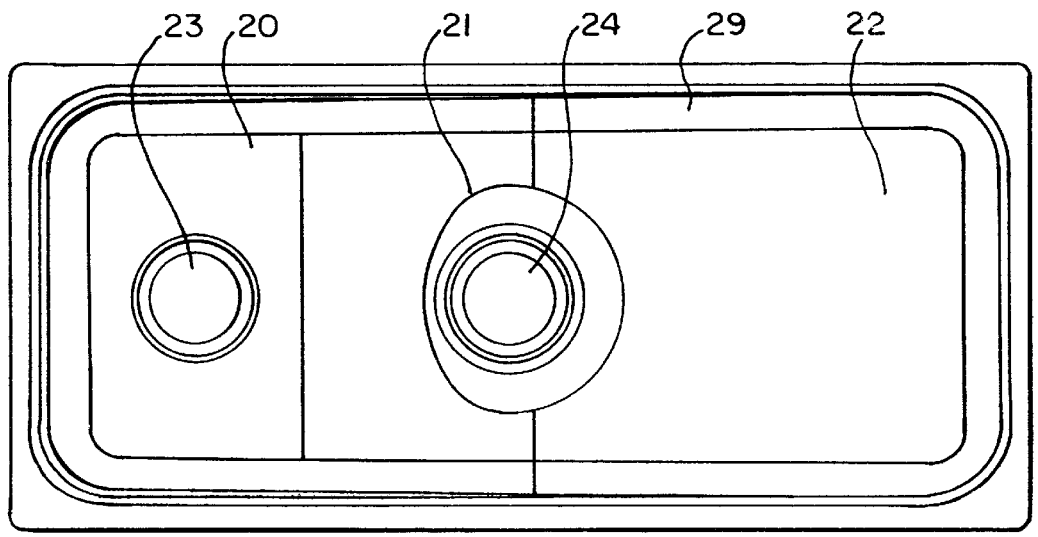
FIGS. 6a–6c are respectively a plan view, a longitudinal side view and a transverse end view of a further embodiment of a sink unit according to the invention with additional drip part.
Figure 6B:
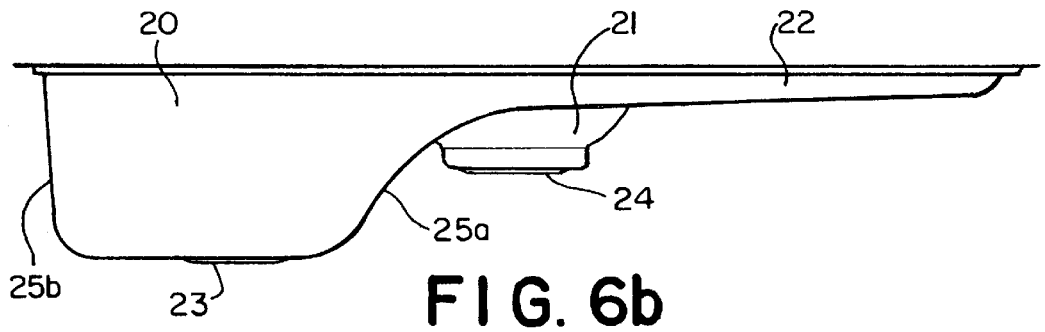
Figure 6C:
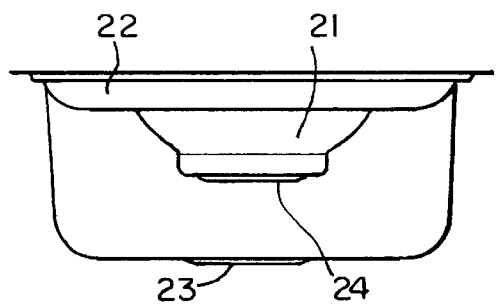

FIGS. 6a–6c depict an alternative embodiment of a sink unit 29 of the invention with a main basin 20, an additional basin 21 and a drip part 22, which connects with the additional basin 21 on the side facing away from the main basin. Furthermore, a drain 23 of the main basin 20 and a drain 24 of the additional basin are clearly recognizable.

As is in particularly apparent from the side view of the sink unit in FIG. 6b, the additional basin 21 is even in this embodiment, on the one hand, formed in a side wall 25a of the main basin 20 and, on the other hand, projects into the main basin. In contrast to the previous embodiment, the side wall in which the additional basin is arranged runs further here with increased flattening and transitions into the drip part 22.

In drains 8, 24 of the additional basin and drains 16, 23 of the main basin, the usual drain armatures are in each case mounted with a relief valve, so that the drains of both basins are closable independently of each other. It lies within the framework of the invention to provide the basin insert 9 instead with its own relief valve into opening 8'. It will be understood, of course, that similar basin inserts and sieves as shown in FIGS. 4 and 5 could also be used in the embodiment of FIG. 6.

Finally, it still should be mentioned that the sinks can be manufactured in the usual manner of stainless steel, ceramic or other suitable materials.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A kitchen sink comprising at least one main basin (2, 20) and an additional basin (3, 21), the main basin having a first side wall (4a, 25a) and a second side wall (4b, 25b) opposite the first side wall, with the first side wall curving inwardly toward the second side wall, the additional basin (3, 21) having its own drain (8, 24), wherein the additional basin (3, 21) has a form of a protrusion of the first side wall (4a, 25a) of the main basin (2, 20) and projects into the main basin (2, 20).

2. The kitchen sink according to claim 1, wherein the protrusion is arranged in the first side wall (4a, 25a) which has a lesser vertical incline than at least the second side wall of the main basin (2, 20).

3. The kitchen sink according to claim 1, wherein the protrusion is restricted to an upper half of the first side wall (4a, 25a).

4. The kitchen sink according to claim 1, further comprising a drip part (22), wherein the first side wall (4a, 25a) with the protrusion forms a transition to the drip part (22).

5. The kitchen sink according to claim 1, wherein at least about half of the additional basin (3, 21), but less than the entire additional basin, lies outside a basic contour of the main bas 6. The kitchen sink according to claim 1, wherein a transition between the main basin (2, 20) and the additional basin (3, 21) is present at a level which lies above the drain (8, 24) of the additional basin (3, 21) but below an upper edge of the additional basin (3, 21).

7. The kitchen sink according to claim 1, wherein the additional basin (3, 21) has a holding device for a basin insert (9) insertable into the additional basin (3, 21).

8. The kitchen sink according to claim 7, wherein the holding device has a releasable closure.

9. The kitchen sink according to claim 8, wherein the releasable closure is selected from the group consisting of a clamp and a bayonet lock.

10. The kitchen sink according to claim 7, wherein the basin insert (9) is adapted to a contour of the additional basin (3, 21) and is constructed substantially axially symmetrical.

11. The kitchen sink according to claim 7, wherein the basin insert (9) has its own drain (8').

12. The kitchen sink according to claim 7, wherein for installation below a counter (13), an upper edge of the basin insert (9) projects above the sink (1, 29) such that the upper edge aligns approximately with an upper surface of the counter (13).

13. The kitchen sink according to claim 7, further comprising a preparation board (14) supportable by the main basin (2, 20), wherein the preparation board (14) is cut out on one side corresponding to a contour of the basin insert (9).

14. The kitchen sink according to claim 1, wherein a slope of the first side wall (4a, 25a) is less than a slope of the second side wall (4b, 25b).

15. The kitchen sink according to claim 1, and further comprising an upper rim that extends around the main basin (2, 20) and the additional basin (3, 21).

16. The kitchen sink according to claim 15, wherein the first side wall (4a, 25a) extends upwardly along the additional basin to the upper rim.

17. The kitchen sink according to claim 1, wherein a portion of the additional basin (3, 21) lies inside a contour of the main basin (2, 20).

* * * * *